United States Patent [19]
Smith

[11] 3,767,232
[45] Oct. 23, 1973

[54] UNDERGROUND ELECTRICAL CONDUIT
[76] Inventor: Rodney I. Smith, Midland, Va.
[22] Filed: May 10, 1971
[21] Appl. No.: 141,751

[52] U.S. Cl.............. 285/55, 285/137 R, 285/230, 285/351
[51] Int. Cl............................................. F16l 9/14
[58] Field of Search................ 285/137 R, 351, 230, 285/231, 288, 55; 138/115

[56] References Cited
UNITED STATES PATENTS

| 1,786,425 | 12/1930 | Christie........................... | 138/115 X |
| 3,305,249 | 2/1967 | Zahuronec...................... | 285/137 R |
| 3,606,395 | 9/1971 | Salerno et al................... | 285/137 R |
| 388,442 | 8/1888 | Phipps............................. | 285/137 R |
| 3,163,448 | 12/1964 | Franklin........................... | 285/230 X |
| 3,575,445 | 4/1971 | French............................. | 285/55 |

FOREIGN PATENTS OR APPLICATIONS

| 702,442 | 3/1966 | Italy............................... | 285/137 R |
| 5,612 | 9/1932 | Australia......................... | 285/55 |
| 649,620 | 1/1951 | Great Britain.................. | 285/288 |

Primary Examiner—Dave W. Arola
Attorney—Fleit, Gipple et al.

[57] ABSTRACT

A joint for a concrete conduit section comprising a first and second conduit section, each section having a bell end, a spigot end and a plurality of ducts therethrough. The spigot end of the second conduit section is adapted to be received in the bell end of the first conduit section with the ducts from one conduit section being in coaxial alignment with the ducts from the other conduit section when the sections are assembled in an end-to-end relationship. The joint has a plurality of sealing members, with the first sealing member being positioned in the bell end and adapted to surround the plurality of ducts while separating each duct into a sealed compartment with the respectively aligned corresponding duct of the corresponding section. The second sealing member is positioned on the spigot end of the second member and comprises an O-ring which is adapted to provide a seal between the outer surface of the spigot end and the inner surface of the bell end.

5 Claims, 5 Drawing Figures

PATENTED OCT 23 1973 3,767,232

Rodney I. Smith
INVENTOR

BY Fleit, Gipple & Jacobson
ATTORNEY

PATENTED OCT 23 1973 3,767,232
SHEET 2 OF 2
Fig. 3
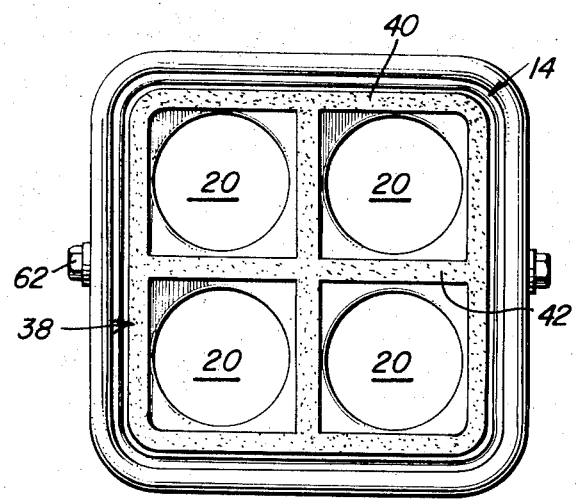
Fig. 5
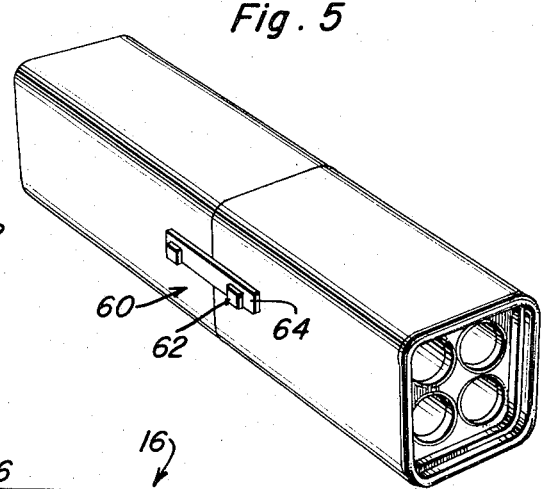
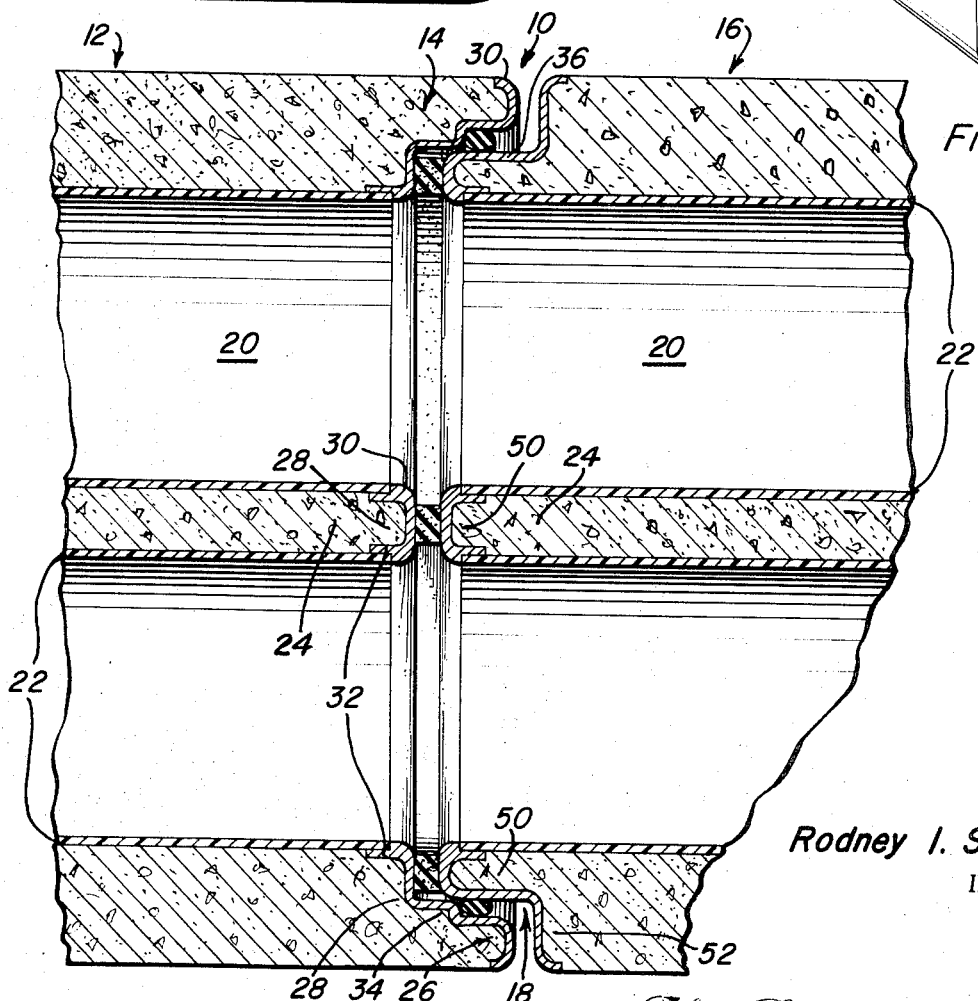
Fig. 4
Rodney I. Smith
INVENTOR
BY *Fleit, Gippie & Jacobson*
ATTORNEY

UNDERGROUND ELECTRICAL CONDUIT

The invention generally relates to concrete conduit sections forming a joint and specifically relates to a conduit joint comprised of conduit sections having a bell end, a spigot end and a plurality of ducts running therethrough. In the invention the bell end is adapted to receive a spigot end of another conduit section in a sealed relationship, thus providing a plurality of sealed ducts which cover and protect wires running therethrough from outside influences and inside influences arising from the relationship of the wires to each other.

The present invention provides an economical, sturdy, fluid-tight joint construction for conduit sections having a plurality of ducts therethrough which serves to keep water and moisture from entering the interior of the conduit. The conduit has two seals, one of which is designed for use between the end walls of the conduit sections and serves as an air seal, while the second seal functions as an O-ring to prevent the entry of fluid into the joint.

Other features and advantages of the invention will be apparent from the following description of the embodiments of the invention as shown in the accompanying drawings.

BRIEF DESCRIPTION OF THE DRAWINGS

FIG. 3 is a front elevational view of the bell end of the conduit section with the sealing member positioned therein.

FIG. 4 is a partial enlarged longitudinal section taken through the joint formed by two conduit sections.

FIG. 5 is a perspective view of two conduit sections secured together.

DETAILED DESCRIPTION OF THE DRAWINGS

Figure 1:
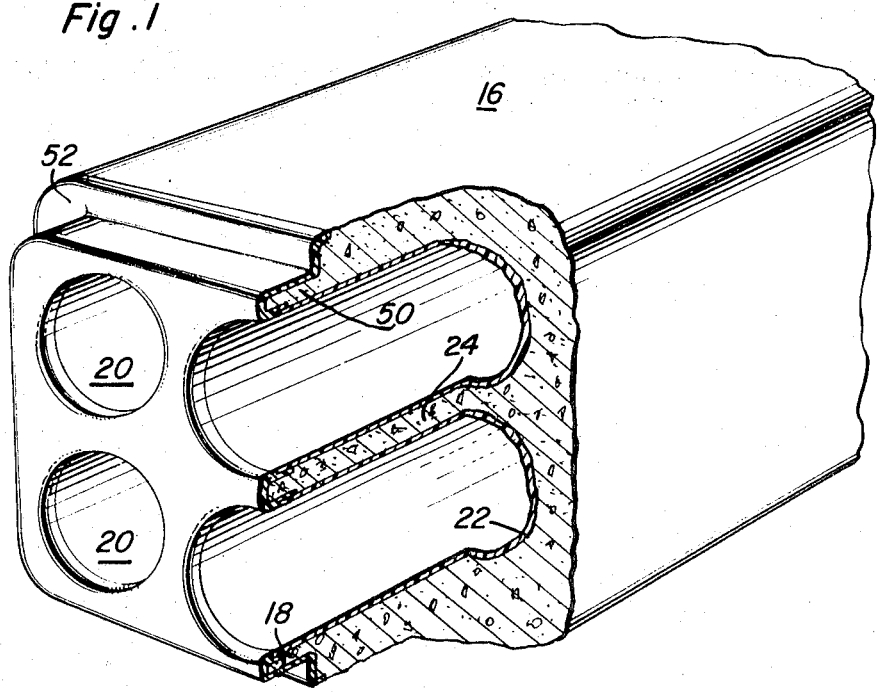
FIG. 1 is a partial sectional view of the spigot end of the concrete conduit section.

As shown in the figures, 10 designates the joint formed by a concrete conduit section 12 havin a bell end 14 and a concrete conduit section 16 having a spigot end 18. Each of the conduit sections is preferably of the electrical-carrying conduit type, in that the sections are made of concrete or other suitable material, with a plurality of ducts or passages 20 running therethrough. The ducts 20 preferably have a circular diameter suitable for carrying cables or any number of wires and are formed by mounting casings 22 in end plates and pouring concrete 24 around them. Preferably the end plates and casings mounted thereto are held in a mold so that when the concrete is poured in the mold it forms a predetermined shaped conduit section around the casings. While the term "concrete" is used throughout the application, it will be understood that other materials can be substituted for concrete, as, for example, plastics or various kinds of cements which can be applied in a plastic or semifluid state and which in time will harden into a solid body. While the ducts formed by the casings are preferably circular in cross section, they can have a rectangular configuration or any other desirable configuration. The casings 22 can be constructed of plastic, ceramic, metallic or fibrous material.

Figure 2:
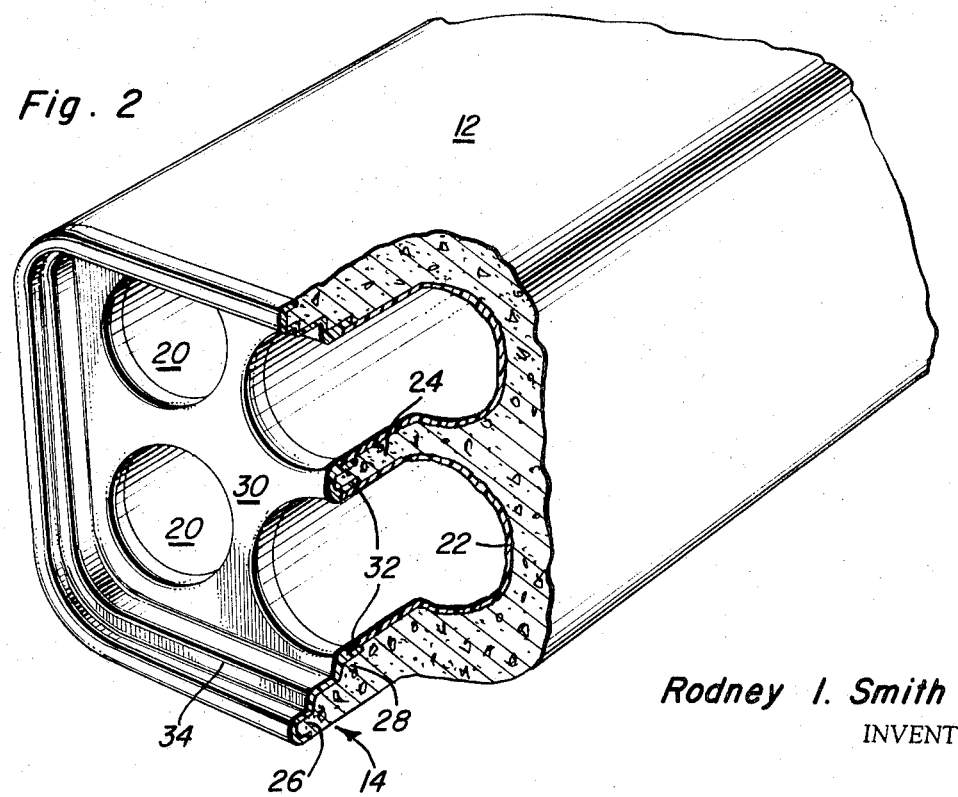
FIG. 2 is a partial sectional view of the bell end of the concrete conduit section.

The bell end 14 of conduit section 12, as shown in FIGS. 2, 3 and 4, has a lip or flange portion 26, which terminates in an inner planar surface 28. Secured to the lip 26, inner planar surface 28 and ducts 20, is an end plate 30, as is shown in FIG. 2. The end plate 30, preferably of one piece constructions, has a plurality of apertures which correspond to and are aligned with the ducts so that the end plate abuts against the casing walls 22 at 32 to form a smooth, continuous surface from the end plate into the ducts formed by the casing. The end plate 30 terminates on the outer surface of the conduit section. In addition, the end plate 30 forms protection for the concrete surfaces 26 and 28, keeping the same from being chipped or broken thus allowing the bell end to be mated together with the corresponding spigot end of section 16 to form a smooth, well-fitting joint. If desired, the end plate 30 can be formed with an inner stop or shoulder 34, as shown in FIGS. 2 and 4 which is adapted to hold an O-ring 36 carried by the spigot end and to provide sufficient spacing between sections that the O-ring does not become compressed beyond use when one section settles slightly out of line. When the O-ring comes under pressure from forces outside the conduit section, the O-ring is forced against the shoulder 34, forming a tight seal.

The O-ring 36 does not mean that the seal member must be circular or must have an O-shape, but only that seal member seals under an O-ring principal of sealing. O-ring gaskets or seals may take many different shapes. For example, an O-ring-type gasket may be square-shaped, delta-shaped or x-shaped. The bell end plate 30 is also adapted to receive a sealing member 38, as shown in FIG. 3, which acts as an air gasket to separate the various ducts so that individual airtight ducts or lines are formed. This feature is important for blowing lines to carry cables or wire through them and also for cleaning purposes. The sealing member 38 preferably comprises a rim member 40, which surrounds the plurality of ducts 20 and inner separating strips 42. The separating strips 42 sealably separate each duct into a sealed compartment with the respectively aligned corresponding duct of the corresponding section and, in the preferred embodiment, forms a cross-shaped configuration. The strips 42 project inwardly from the rim member in any desired manner depending on the number and configuration of the ducts. The sealing member 38 preferably acts as an air seal to confine each aligned set of ducts to a specific air space.

The end of the spigot section 16 is provided with an inner projection 50 and outer shoulder surface 52. An end plate 54 is preferably secured to the projection 50 and outer shoulder 52. The end plate 54 is preferably of one-piece construction, with a plurality of apertures which correspond to and are aligned with the respective ducts in the conduit section. The end plate 54 terminates on the outer surface of conduit section 16, is connected to the casing walls and serves to keep the section body from chipping in the same manner as end plate 30.

Both end plates 30 and 54 are preferably of plastic construction, but a metallic or fibrous embodiment can also be utilized. Projection 50 of end plate 54 is adapted to carry an O-ring 36 until it abuts against stop or shoulder 34 of end plate 30, forming a fluid-tight seal. If desired, a stop or shoulder not shown can be integrally formed with the end plate 54 to carry the O-ring 36. The end plates 30 and 54, when mated, are air-sealed by sealing member 38. While sealing member 38 is preferably of a foam rubber composition, it can be formed of any other suitable plastic or synthetic rubber, preferably of a non-conductive nature.

The conduit sections, when assembled and forced together in the position shown in FIGS. 4 and 5, do not require any sealing compounds. The sections are not only held together by the sealing relation of the joint, but also by a mechanical link 60, which secures each conduit section of the joint in a fixed predetermined spaced position. The mechanical link 60, as shown by FIGS. 3 and 5, preferably comprises a bolt 62 which is adapted to be embedded or screwed in an insert provided in the outer surface of the conduit section. A link member 64, of a predetermined length, is constructed with a plurality of apertures therein, each aperture being sized to allow the respective bolts 62 of each section to be inserted therethrough so that the sections are secured together in a spaced end relationship.

Each conduit section is provided at one end with a bell or socket and at the opposite end with a spigot. In uniting conduit sections together to form a joint, the spigot or male end of one section carrying an O-ring is brought into contact with the sealing member 38 carried by the bell or female end of the other section and pushed or shoved together, compressing sealing member 38 to form an air-tight seal while seating the O-ring against the shoulder 34 of the bell end. This keeps water or pressurized fluid from entering the joint, thus providing a dry sealed joint. The bolts 62 are placed through the apertures of link member 64 into the conduit sections inserted, thus securing the joint in a spaced relationship.

While the preferred embodiment of the invention has been disclosed, it is understood that the invention is not limited to such an embodiment, since it may be otherwise embodied in the scope of the appended claims.

What is claimed is:

1. A joint for conduit sections comprising a first concrete conduit section having a bell end, said bell end comprising a lip defining a cavity and having an annular rim on its inner surface forming a shoulder, a second concrete conduit section having a spigot end adapted to be received in the bell end of said first conduit section, an end plate secured to the bell end of said first conduit section and the spigot end of said second conduit section, said end plate being constructed of a different material than said conduit sections and defining a plurality of apertures therein, said first conduit section and said second conduit section having a plurality of ducts therethrough from end to end, each of said ducts comprising a plastic tube positioned in said concrete sections, and wherein said end plates apertures are coaxially aligned with the openings of said ducts, said end plates being in abutting engagement with said ducts and extending outwardly to terminate on the outer surface of said conduit sections, the ducts of one conduit section being in coaxial alignment with the ducts from the other conduit section when the sections are assembled in end-to-end relationship, and a plurality of resilient seal members, a first seal member positioned in the cavity defined by said bell end, said seal member being adapted to surround said plurality of ducts while separating each of said ducts into a sealed relationship with the respective aligned duct of the corresponding section and a second seal member, carried by said spigot end, said second seal member comprising an O-ring positioned to engage and seat against in a sealing position the outer surface of said spigot end and said annular rim on the inner surface of the lip of said bell end when said spigot end is positioned against said bell end.

2. A joint for conduit sections as claimed in claim 1, wherein said first sealing member comprises a rim member surrounding said ducts and a plurality of inwardly projecting strips connected to said rim member, said inwardly projecting strips being adapted to separate each set of coaxially aligned ducts into a separate, sealed compartment.

3. A joint for conduit sections as claimed in claim 2, wherein said inwardly projecting strips have a cross-type configuration.

4. A joint for conduit sections as claimed in claim 1, wherein mechanical link means are provided on each conduit section to allow each section to be secured in a predetermined spaced relationship.

5. A joint for conduit sections as claimed in claim 1, wherein each of said conduit sections has a bell end and a spigot end.

* * * * *